United States Patent
Harada et al.

(10) Patent No.: US 10,184,674 B2
(45) Date of Patent: Jan. 22, 2019

(54) VAPOR SEPARATOR AND DEHUMIDIFIER USING THE SAME

(71) Applicant: KABUSHIKI KAISHA TOSHIBA, Minato-ku (JP)

(72) Inventors: Kouichi Harada, Bunkyo (JP); Ryosuke Yagi, Yokohama (JP); Hitomi Saito, Kawaguchi (JP); Nao Kobayashi, Kawasaki (JP); Maki Yonetsu, Mitaka (JP); Seiichi Suenaga, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 283 days.

(21) Appl. No.: 15/251,414

(22) Filed: Aug. 30, 2016

(65) Prior Publication Data
US 2017/0074529 A1    Mar. 16, 2017

(30) Foreign Application Priority Data

Sep. 16, 2015 (JP) .................................. 2015-182451
Nov. 17, 2015 (JP) .................................. 2015-224422

(51) Int. Cl.
*B01D 53/02* (2006.01)
*F24F 3/14* (2006.01)
*B01D 53/26* (2006.01)

(52) U.S. Cl.
CPC .......... *F24F 3/1411* (2013.01); *B01D 53/263* (2013.01); *B01D 2251/302* (2013.01);
(Continued)

(58) Field of Classification Search
CPC ........ B01D 2251/302; B01D 2251/304; B01D 2251/306; B01D 2251/404; B01D 2251/604; B01D 2251/606; B01D 2251/608; B01D 2251/61; B01D 2251/80; B01D 2259/4508; B01D 53/263; F24F 2003/1435; F24F 3/1411
See application file for complete search history.

(56) References Cited

U.S. PATENT DOCUMENTS 3,176,446 A * 4/1965 Siggelin ................ B01D 45/14
                                                           165/10
4,583,996 A * 4/1986 Sakata ................... B01D 53/22
                                                           264/167

(Continued)

FOREIGN PATENT DOCUMENTS

| JP | 57-144829 | 9/1982 |
|----|-----------|--------|
| JP | 63-77518  | 4/1988 |

(Continued)

*Primary Examiner* — Christopher P Jones
(74) *Attorney, Agent, or Firm* — Oblon, McClelland, Maier & Neustadt, L.L.P.

(57) ABSTRACT

A vapor separator in an embodiment is arranged between a first space and a second space, and is used to allow vapor existing in the first space to permeate the second space by making a vapor pressure in the second space lower than a vapor pressure in the first space. The vapor separator in the embodiment includes: a porous body having a first face, a second face opposite to the first face, and fine pores passing from the first face to the second face; and a soluble absorbent existing in the fine pores of the porous body.

12 Claims, 3 Drawing Sheets

(52) U.S. Cl.
CPC .. *B01D 2251/304* (2013.01); *B01D 2251/306* (2013.01); *B01D 2251/404* (2013.01); *B01D 2251/604* (2013.01); *B01D 2251/606* (2013.01); *B01D 2251/608* (2013.01); *B01D 2251/61* (2013.01); *B01D 2251/80* (2013.01); *B01D 2259/4508* (2013.01); *F24F 2003/1435* (2013.01)

(56) References Cited

U.S. PATENT DOCUMENTS

| | | | |
|---|---|---|---|
| 4,826,516 | A | 5/1989 | Matsuoka et al. |
| 8,506,675 | B2 * | 8/2013 | Ellsworth ............ B01D 53/261 95/10 |
| 2002/0104439 | A1 * | 8/2002 | Komkova ............ B01D 53/22 96/4 |
| 2007/0185292 | A1 * | 8/2007 | Nishida ............ B01D 53/261 526/214 |
| 2008/0034966 | A1 * | 2/2008 | Kesten ............ B01D 53/229 95/52 |
| 2009/0071621 | A1 * | 3/2009 | Oles ............ B22C 9/12 164/7.1 |
| 2009/0293359 | A1 * | 12/2009 | Simmons ............ C01B 3/34 48/127.7 |
| 2011/0223486 | A1 * | 9/2011 | Zhang ............ B01D 67/0027 429/247 |
| 2012/0304862 | A1 * | 12/2012 | Taylor ............ B01D 53/268 96/8 |
| 2014/0239225 | A1 | 8/2014 | Yamazaki et al. |
| 2014/0374929 | A1 * | 12/2014 | Fujita ............ F28D 21/0015 261/129 |
| 2015/0298053 | A1 * | 10/2015 | Mai ............ B01D 53/265 D53/265 |
| 2016/0377302 | A1 * | 12/2016 | Hamlin ............ F24F 3/1417 165/56 |
| 2017/0232383 | A1 * | 8/2017 | Yeung ............ B01J 20/22 95/117 |
| 2017/0259205 | A1 * | 9/2017 | Harada ............ B01D 53/261 |

FOREIGN PATENT DOCUMENTS

| | | |
|---|---|---|
| JP | 63-218234 | 9/1988 |
| JP | 7-328375 | 12/1995 |
| JP | 2000-350918 | 12/2000 |
| JP | 2001-149736 | 6/2001 |
| JP | 2009-183905 | 8/2009 |
| JP | 2011-143358 | 7/2011 |
| JP | 2011-163651 | 8/2011 |
| JP | 2012-66157 | 4/2012 |
| WO | WO 2013/069719 A1 | 5/2013 |

* cited by examiner

VAPOR SEPARATOR AND DEHUMIDIFIER USING THE SAME

CROSS-REFERENCE TO RELATED APPLICATIONS

This application is based upon and claims the benefit of priority from Japanese Patent Application No. 2015-182451, filed on Sep. 16, 2015, and Japanese Patent Application No. 2015-224422, filed on Nov. 17, 2015; the entire contents of which are incorporated herein by reference.

FIELD

Embodiments described herein relate generally to a vapor separator and a dehumidifier using the same.

BACKGROUND

Air-conditioning technology for a domestic air conditioner progresses in both coolant and energy efficiency, and more comfortable life environment is required with the progress. Therefore, the air conditioner is made to have more functions not only for temperature but also for humidity control, ventilation, air flow control, and air cleaning. An improvement in energy efficiency is the most important issue also because of recent energy shortage. Also in hot and humid Asian countries, humidity control, in particular, dehumidification is considered to be important with improvement in standard of living. Performance of the dehumidification in an energy-saving manner can realize air conditioning with less environmental load. In dehumidification by cooling with coolant using a compressor that is a mainstream at present, a large quantity of energy is required to cool air so as to condensate vapor and to reheat the cooled air so as to regulate temperature. This increases power consumption, leading to an issue in magnitude of the environmental load.

In contrast, in a dehumidifier such as a desiccant air conditioner, a moisture absorber using an absorbent material absorbing vapor absorbs moisture in a room, and is heated to discharge the moisture to the outdoors. This dehumidification is therefore superior in energy saving performance to the coolant-type dehumidification. There are known absorbent materials made by impregnating a porous body such as porous ceramic or zeolite with and supporting a deliquescent substance made of chloride or bromide of sodium, lithium, calcium, or magnesium. The absorbent material (humidity controlling material), however, continues to absorb water and is finally saturated, and therefore needs to be subjected to regeneration treatment. The regeneration treatment for the absorbent material is performed by heating the absorbent material in order to discharge the absorbed water. Combination of the regeneration treatment (heat treatment) for the absorbent material and air cooling is inefficient.

As a method with less energy and at low cost alternative to the current air-conditioning method, a continuous dehumidification method using a vapor separator requiring no regeneration treatment is under discussion. An example of the structure of a humidity controller using the vapor separator is a structure in which a vapor separator made by filling a gap between two vapor permeable membranes using polyethylene or fluorine resin with a liquid absorbent such as a lithium chloride solution, is arranged between a space such as the interior of a room to be dehumidified and a space such as the exterior of the room. The vapor is sent and received between the air in the room and the liquid absorbent through the vapor permeable membranes. The vapor permeable membranes are, however, apt to break, and this method has difficulty in efficiently performing dehumidification because of low moving speed of vapor.

DETAILED DESCRIPTION

One embodiment provides a vapor separator (water vapor separator) arranged between a first space and a second space and configured to be used for allowing vapor existing in the first space to permeate the second space by making a vapor pressure in the second space lower than a vapor pressure in the first space, the vapor separator including: a porous body having a first face, a second face opposite to the first face, and fine pores passing from the first face to the second face; and a soluble absorbent (water-soluble absorbent) existing in the fine pores of the porous body.

Another embodiment provides a dehumidifier including: a first space; a second space communicating with the first space; the vapor separator in the embodiment provided to separate the first space and the second space while exposing the first face in the first space and exposing the second face in the second space; and a vapor pressure adjusting unit which adjusts a vapor pressure in the second space to make the vapor pressure in the second space lower than a vapor pressure in the first space. The dehumidifier is an apparatus which allows the vapor existing in the first space to permeate the second space through the vapor separator.

Hereinafter, the vapor separator and the dehumidifier using the same according to the embodiments will be described referring to the drawings. In the embodiments, substantially the same constituent portions are denoted by the same numerals and symbols and their description may be partially omitted. The drawings are schematic and relations between thicknesses and planar dimensions and ratios between thicknesses of portions may be different from actual ones. The terms indicating directions such as up and down in the description may be different from actual directions set using a gravitational acceleration direction as a reference.

Figure 1:
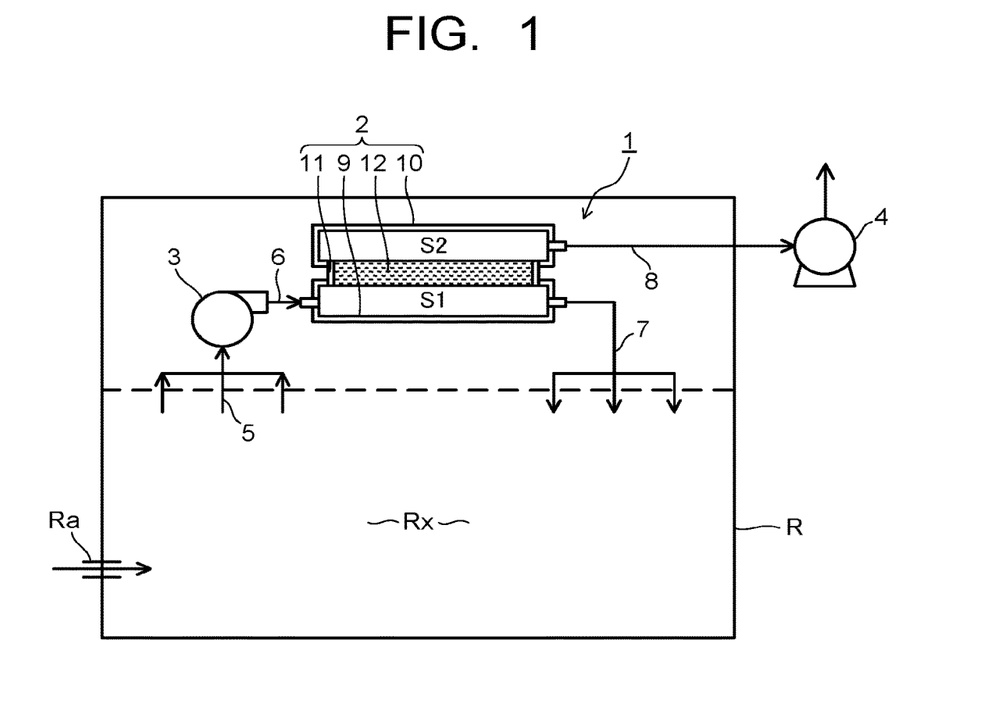
FIG. 1 is a diagram illustrating a configuration of a dehumidifier in an embodiment.

FIG. 1 illustrates a configuration of the dehumidifier of the embodiment. In FIG. 1, R denotes a room constituting a dehumidification target space Rx, and the room R has an intake port Ra. A dehumidifier 1 is provided in the room R to remove vapor (moisture) from air in the dehumidification target space Rx. The air in the space Rx is basically composed of vapor (moisture) and dry air. The dehumidifier 1 includes a dehumidifying module 2, a blower 3 that sends the air in the space Rx to the dehumidifying module 2, and a pressure-reducing pump 4 that reduces the pressure in a part of the dehumidifying module 2. The space Rx and the blower 3 are connected via a pipe 5, the blower 3 and the dehumidifying module 2 are connected via a pipe 6, and the dehumidifying module 2 and the space Rx are connected via a pipe 7. The dehumidifying module 2 and the pressure-reducing pump 4 are connected via a pipe 8.

The dehumidifying module 2 has a dehumidified chamber (a first ventilation passage) 9 constituting a first space S1, a pressure-reduced chamber (a second ventilation passage) 10 constituting a second space S2, a connecting channel 11 connecting the dehumidified chamber 9 and the pressure-reduced chamber 10, and a vapor separator 12 arranged in the connecting channel 11 to separate the dehumidified chamber 9 and the pressure-reduced chamber 10. The blower 3 is operated to send the air in the space Rx into the dehumidified chamber 9 of the dehumidifying module 2 via the pipes 5, 6. The air dehumidified in the dehumidified chamber 9 is returned to the space Rx via the pipe 7. The pressure-reducing pump 4 evacuates the pressure-reduced chamber 10 to generate a difference between the pressure in the dehumidified chamber 9 (pressure in the first space S1) and the pressure in the pressure-reduced chamber 10 (pressure in the second space S2).

Figure 2:
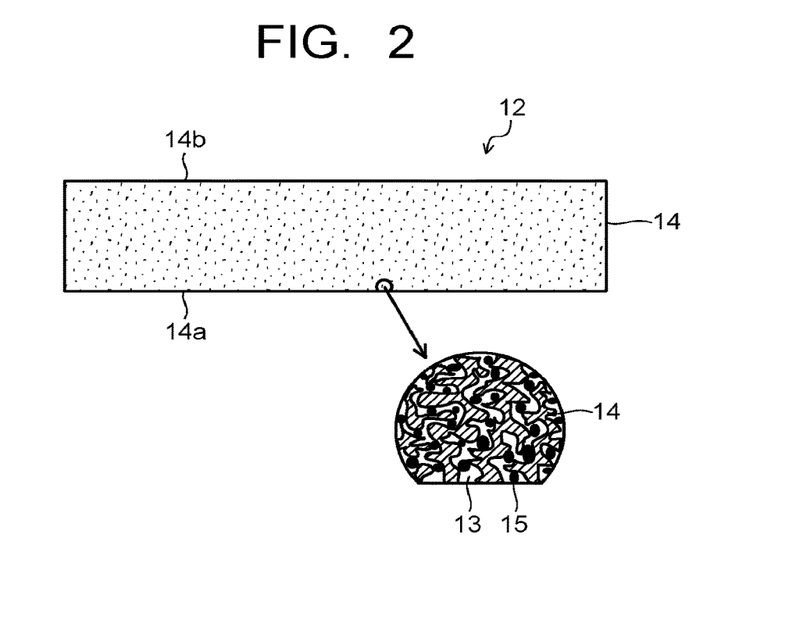
FIG. 2 is a cross-sectional view illustrating a vapor separator used in the dehumidifier illustrated in FIG. 1.

As illustrated in FIG. 2, the vapor separator 12 includes a porous body 14 having fine pores 13, and a soluble absorbent 15 existing in the fine pores 13 of the porous body 14. The porous body 14 has, for example, a rectangular parallelepiped shape, and has a first face 14a exposed inside the dehumidified chamber 9 (the first space S1) and a second face 14b exposed inside the pressure-reduced chamber 10 (the second space S2). The fine pores 13 provided in the porous body 14 pass from the first face 14a to the second face 14b. The soluble absorbent 15 absorbs moisture to form a wet seal. The porous body 14 is made of a ceramic material, a metal material, an organic material, a carbon material or a composite material of them, and has open pores. As the soluble absorbent 15, citrate, carbonate, phosphate, halide salt, oxysalt, hydroxide salt, or sulfate of a group 1 element or a group 2 element is used. The vapor separator 12 may originally contain moisture or may be made to contain moisture when used. The configuration of the vapor separator 12 will be described later in detail. The soluble absorbent 15 is illustrated to be segregated in the fine pore 13 in FIG. 2. The soluble absorbent 15 is, however, not limited in existence form to this but may adhere thin and uniformly to the whole or part of an inner wall of the fine pore 13.

Figure 3:
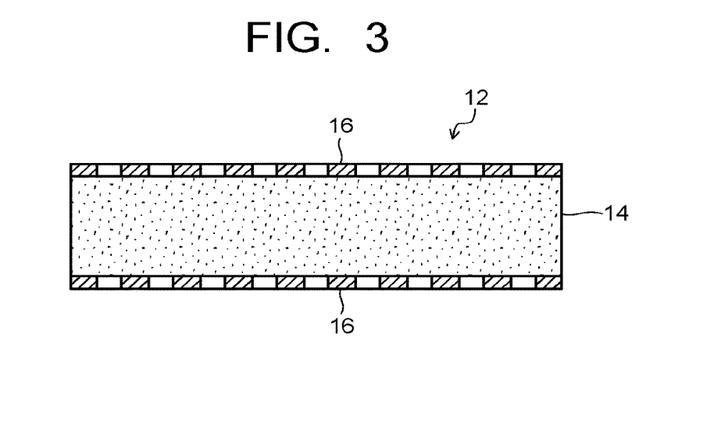
FIG. 3 is a cross-sectional view illustrating a use example of the vapor separator illustrated in FIG. 2.

The vapor separator 12 used for the dehumidifier 1 may be supported as illustrated in FIG. 3 by substrates 16 that allow gas to permeate. FIG. 3 illustrates a state in which a pair of substrates 16 are arranged along both faces of the vapor separator 12, but the substrate 16 may be arranged along only one of the faces of the vapor separator 12. For the substrate 16, a porous body, a punching material, or a mesh material having open pores made of a ceramic material, a metal material, an organic material, a carbon material or a composite material of them is used. Specific examples include paper, polyimide porous body, and punching metal. The substrate 16 preferably has through holes having a diameter of, but not limited to, several micrometers or more.

The vapor separator 12 may be formed directly on the substrate 16. The vapor separator 12 may be fabricated, for example, by a method of forming a porous body by the cold spraying method or the aerosol deposition method and then impregnating the porous body with a soluble absorbent. A multilayer porous body may be made by forming a raw ceramic material forming the porous body 14 of the vapor separator 12 having a smaller pore size into layers on a raw ceramic base material having a larger pore size, and then sintering them. The multilayer porous material is ceramics here but not limited to this, and may be formed of metal or resin. Its shape is not limited to a sheet shape but may be a honeycomb shape or a tube shape.

The air in the dehumidification target space Rx is sent into the dehumidified chamber 9 of the dehumidifying module 2 by the blower 3 as described above. The pressure-reducing pump 4 is operated simultaneously with the blower 3 to reduce the pressure in the pressure-reduced chamber 10. This generates a difference between the pressure in the dehumidified chamber 9 and the pressure in the pressure-reduced chamber 10. The pressure difference makes the vapor pressure in the pressure-reduced chamber 10 (a vapor pressure in the second space S2) lower than the vapor pressure in the dehumidified chamber 9 (a vapor pressure in the first space S1). The vapor pressure difference and the moisture held in the soluble absorbent 15 cause movement of the vapor (moisture) between the dehumidified chamber 9 and the pressure-reduced chamber 10 via the vapor separator 12.

For moving the vapor (moisture) through the vapor separator 12, the pressure-reducing pump 4 preferably reduces the pressure in the pressure-reduced chamber 10 so that the pressure in the pressure-reduced chamber 10 becomes −50 kPa or less relative to the pressure in the dehumidified chamber 9. In other words, the pressure-reducing pump 4 preferably reduces the pressure in the pressure-reduced chamber 10 so that the difference between the pressure in the dehumidified chamber 9 and the pressure in the pressure-reduced chamber 10 becomes 50 kPa or more. A pressure difference of less than 50 kPa may fail to sufficiently promote the movement of the vapor (moisture) from the inside of the dehumidified chamber 9 to the inside of the pressure-reduced chamber 10. The pressure difference between the dehumidified chamber 9 and the pressure-reduced chamber 10 is further preferably less than 100 kPa. A too-large pressure difference may damage the porous body 14 constituting the vapor separator 12. The pressure difference between the dehumidified chamber 9 and the pressure-reduced chamber 10 is more preferably in a range of 80 to 90 kPa.

In the dehumidifier 1 illustrated in FIG. 1, the pressure-reducing pump 4 reducing the pressure in the pressure-reduced chamber 10 generates the vapor pressure difference between the dehumidified chamber 9 and the pressure-reduced chamber 10. An adjusting unit for the vapor pressure is not limited to this. The adjusting unit may be configured, for example, to introduce dry air or heated air into the pressure-reduced chamber 10 (the second space S2). These configurations can generate the vapor pressure difference between the dehumidified chamber 9 and the pressure-reduced chamber 10. In the dehumidifier 1 illustrated in FIG. 1, a vapor pressure adjusting unit generating the vapor pressure difference between the dehumidified chamber 9 and the pressure-reduced chamber 10 is not particularly limited, but various mechanisms capable of generating the vapor pressure difference are applicable.

The vapor (moisture) contained in the air in the dehumidified chamber 9 relatively high in vapor pressure is absorbed into the soluble absorbent 15 in the vapor separator 12. The moisture in the vapor separator 12 permeates the pressure-reduced chamber 10 having a relatively low vapor pressure. Depending on the balance among the vapor pressure in the dehumidified chamber 9, the vapor pressure in the pressure-reduced chamber 10, and the amount of moisture in the vapor separator 12, absorption of the vapor (moisture) contained in the air in the dehumidified chamber 9 by the vapor separator 12 and release of the moisture in the vapor separator 12 into the pressure-reduced chamber 10 occur in succession. This can reduce the amount of moisture in the air sent from the space Rx into the dehumidified chamber 9 for dehumidification. The dehumidified air is returned to the space Rx. The moisture permeated the pressure-reduced chamber 10 is discharged to the outside via the pipe 8 and the pressure-reducing pump 4. The moisture permeated the pressure-reduced chamber 10 may be sent to a third space such as a room requiring humidification. The vapor separator 12 in the embodiment can also be used as an apparatus for both dehumidification and humidification.

In the dehumidifier 1 in the embodiment, the vapor separator 12 forms the wet seal to make it possible to move only the moisture contained in the air in the dehumidified chamber 9 into the pressure-reduced chamber 10. Between the dehumidified chamber 9 and the pressure-reduced chamber 10, basically, only the moisture in the air moves and the dry air in the air hardly moves. This rarely fluctuates the temperature in the dehumidification target space Rx. Dehumidification in the space Rx without rarely fluctuating the temperature in the space Rx eliminates the possibility of declining the thermal efficiency, for example, even in combination with air cooling in the space Rx. This can result in improved thermal efficiency when using the dehumidifier 1 in combination with air cooling.

Figure 4:
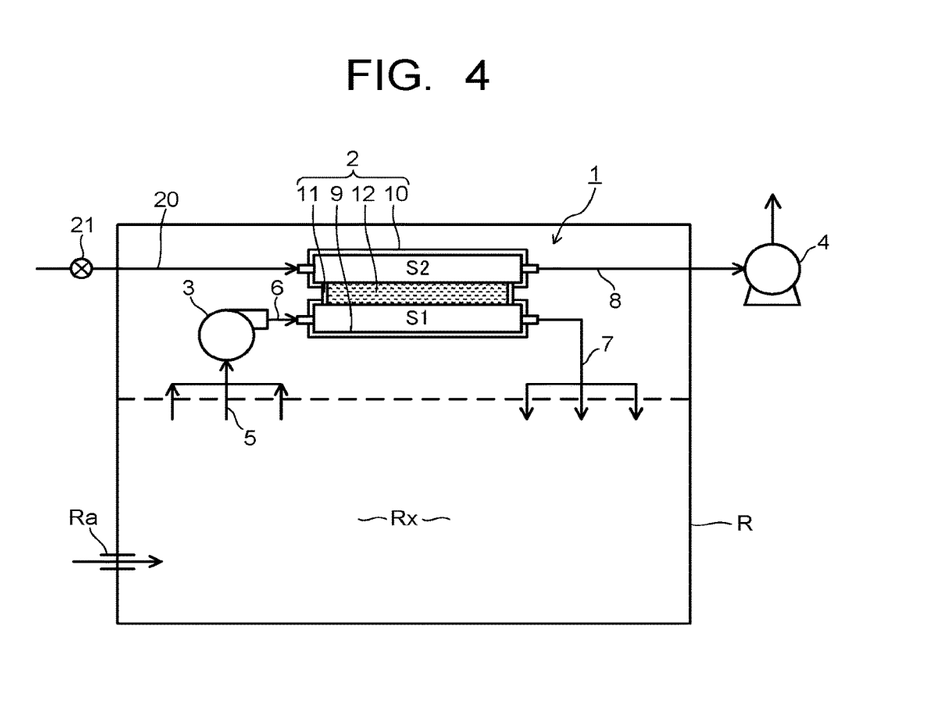
FIG. 4 is a diagram illustrating a first modification example of the dehumidifier illustrated in FIG. 1.
Figure 5:
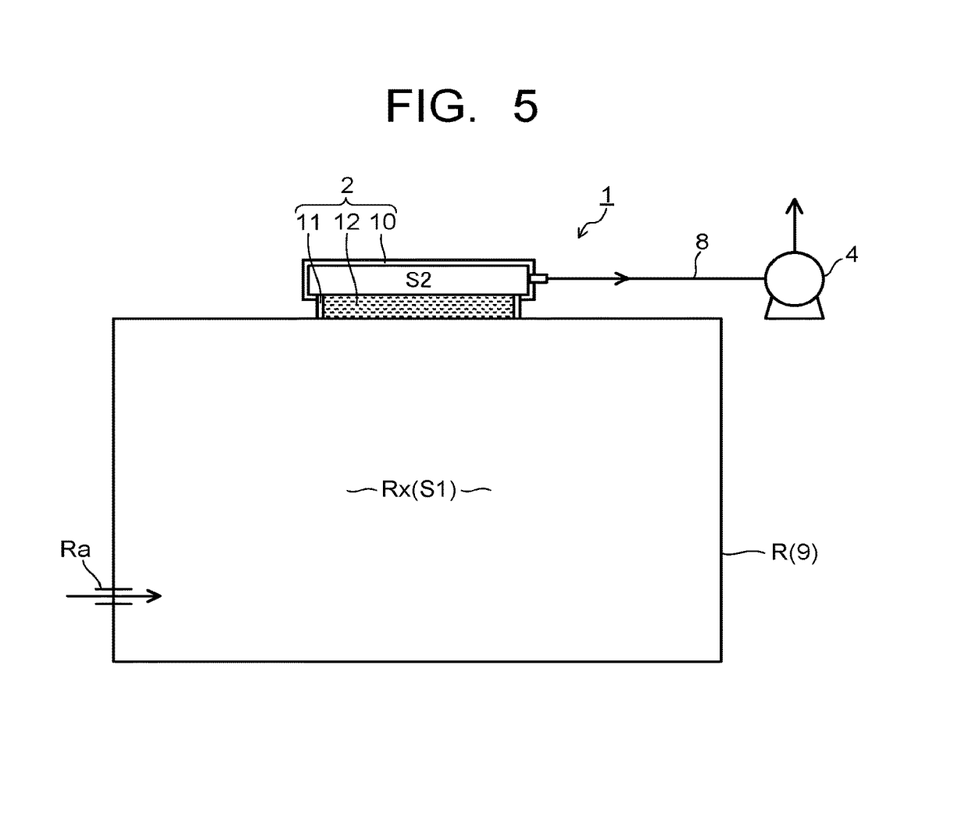
FIG. 5 is a diagram illustrating a second modification example of the dehumidifier illustrated in FIG. 1.

The structure of the dehumidifier 1 in this embodiment is not limited to the structure illustrated in FIG. 1. FIG. 4 illustrates a structure in which a pipe 20 taking in the outside air is connected to the pressure-reduced chamber 10 (the second space S2). In the dehumidifier 1 illustrated in FIG. 4, the pressure in the pressure-reduced chamber 10 is reduced while the outside air is being taken into the pressure-reduced chamber 10. The pipe 20 has a valve 21. The dehumidifier 1 in the embodiment can be variously modified. The first space S1 is set in the dehumidified chamber 9 of the dehumidifying module 2 in FIG. 1 and FIG. 4, but is not limited to this. As illustrated in FIG. 5, the first space S1 may be the dehumidification target space Rx itself. The pressure-reduced chamber 10 being the second space S2 and the space Rx being the first space S1 may be arranged with the vapor separator 12 intervening between them. In this case, the reduction of the pressure in the pressure-reduced chamber 10 directly removes the vapor (moisture) from the air in the dehumidification target space Rx (the first space S1). The setting of the first space S1 and the second space S2 can be variously modified.

Next, the vapor separator 12 will be described in detail. For the soluble absorbent (water-soluble absorbent) 15 constituting the vapor separator 12, citrate, carbonate, phosphate, halide salt, oxysalt, hydroxide salt, or sulfate of a group 1 element such as sodium (Na), potassium (K), or lithium (Li) or a group 2 element such as magnesium (Mg) or calcium (Ca) (hereinafter, referred to also as an element A) is used. These compounds may be independently used or used in combination. Specific examples of the soluble absorbent 15 include calcium chloride ($CaCl_2$), lithium chloride (LiCl), sodium chloride (NaCl), potassium chloride (KCl), lithium bromide (LiBr), sodium bromide (NaBr), potassium bromide (KBr), lithium iodide (LiI), sodium iodide (NaI), potassium iodide (KI), calcium oxide (CaO), sodium oxide ($Na_2O$), potassium oxide ($K_2O$), calcium hydroxide (Ca$(OH)_2$), sodium hydroxide (NaOH), potassium hydroxide (KOH), lithium hydroxide (LiOH), calcium carbonate ($CaCO_3$), magnesium carbonate ($MgCO_3$), lithium carbonate ($Li_2CO_3$), sodium carbonate ($Na_2CO_3$), potassium carbonate ($K_2CO_3$), sodium phosphate ($Na_3PO_4$), potassium phosphate ($K_3PO_4$), sodium citrate ($Na_3(C_3H_5O(COO)_3$ and so on), potassium citrate ($K_3(C_3H_5O(COO)_3$ and so on), sodium sulfate ($Na_2SO_4$), potassium sulfate ($K_2SO_4$), lithium sulfate ($Li_2SO_4$), and their hydrates.

The porous body 14 is made of a ceramic material, a metal material, an organic material, a carbon material or a composite material of them. Examples of the ceramic material include oxide, nitride, carbide, and composite compounds of them of elements such as aluminum (Al), silicon (Si), zinc (Zn), magnesium (Mg), calcium (Ca), barium (Ba), nickel (Ni), cobalt (Co), iron (Fe), chromium (Cr), titanium (Ti), zirconium (Zr), and copper (Cu) (hereinafter, referred to also as an element B). Examples of the metal material include metal elements such as aluminum, zinc, magnesium, nickel, cobalt, iron, titanium, zirconium, and copper (hereinafter, referred to also as an element C), and alloys containing them. Examples of the organic material include a resin including an unsaturated bond in a main chain or a side chain, a resin including an ester bond, a resin containing halogen, a resin including an ether ring, a resin including an amide bond, a resin including an imide bond, a resin including an aromatic ring, a resin containing silicon, a cellulose-based resin, copolymers of them, and natural fiber. Specific examples of the organic material include polyolefin, halogenated polyolefin, polysulfone, polycarbonate, polyamide, polyester, acrylic fiber, cotton, wool, rayon, and acetate fiber.

The volume porosity of the porous body 14 (the volume fraction of the fine pores 13 in the porous body 14) is preferably in a range of 10 to 80%. When the volume porosity of the porous body 14 is less than 10%, the vapor capable of passing through the fine pores 13 decreases and may result in an insufficient absorption amount of moisture from the inside of the dehumidified chamber 9 and an insufficient release amount of moisture to the pressure-reduced chamber 10. When the volume porosity of the porous body 14 is more than 80%, the strength of the porous body 14 decreases and may hinder continuous operation of the dehumidifier 1. From the viewpoint of the vapor separation ratio and the vapor permeation rate, the volume porosity of the porous body 14 is more preferably in a range of 10 to 50%, and furthermore preferably in a range of 20 to 50%. It is, however, preferable to set the volume porosity of the porous body 14 according to the property required of the vapor separator 12. For example, for increasing dehumidification characteristics such as the vapor separation ratio and the vapor permeation rate, it is preferable to set the volume porosity relatively high. On the other hand, for increasing the mechanical strength of the vapor separator 12 or for reducing the cost of the vapor separator 12, it is preferable to set the volume porosity relatively low.

The fine pores 13 of the porous body 14 preferably contain 50 mass % or more of fine pores having a pore size in a range of 10 nm to 1 μm. The maximum pore size of the fine pores 13 is preferably 3 μm or less. An amount of the fine pores having the above pore size of less than 50 mass % (for example, a large volume fraction of fine pores having a pore size of more than 1 μm) or a maximum pore size of more than 3 μm causes a decrease in wet sealing property or a decrease in balance between absorption of moisture from the inside of the dehumidified chamber 9 and the release of moisture to the pressure-reduced chamber 10, and thus may decrease the dehumidification performance. The amount of the fine pores having the above pore size is more preferably 70 mass % or more, and furthermore preferably 100 mass %. The maximum pore size of the fine pores 13 is more preferably 2 μm or less, and furthermore preferably 1 μm or less. Note that the volume porosity of the porous body 14 and the shape of the fine pores 13 (the volume porosity and the maximum pore size of the fine pores) indicate values measured by the mercury intrusion method.

Further, the pore size of the fine pores 13 is preferably set according to the characteristics required of the vapor separator 12. For example, for increasing the vapor separation ratio by the vapor separator 12, the fine pores 13 preferably contain 50 mass % or more of fine pores having a pore size in a range of 10 nm to 100 nm. In this case, the maximum pore size of the fine pores 13 is preferably 300 nm or less. On the other hand, for increasing the vapor permeation rate of the vapor separator 12, the fine pores 13 preferably contain 50 mass % or more of fine pores having a pore size in a range of 100 nm to 1 μm. In this case, the maximum pore size of the fine pores 13 is preferably 3 μm or less, and more preferably 2 μm or less. The characteristics of the vapor separator 12 is influenced also by the volume porosity of the porous body 14, and therefore it is preferable to set the pore size of the fine pores 13 in consideration of the volume porosity.

In the vapor separator 12 in the embodiment, the amount of the soluble absorbent 15 allowed to exist in the fine pores 13 of the porous body 14 is preferably adjusted to make the ratio of the element A constituting the soluble absorbent 15 to the element B constituting the ceramic material or the element C constituting the metal material (A/B or A/C: atom ratio) fall within a range of 0.004 to 0.4 when the porous body 14 is composed of the ceramic material or the metal material. The A/B ratio or A/C ratio of less than 0.004 leads to an insufficient amount of the soluble absorbent 15. The A/B ratio or A/C ratio of more than 0.4 makes it more difficult to allow the soluble absorbent 15 to exist in the fine pores 13 of the porous body 14. The A/B ratio or the A/C ratio is more preferably in a range of 0.008 to 0.25. The soluble absorbent 15 may be evenly or unevenly distributed on inner walls of the fine pores 13.

The method of manufacturing the vapor separator 12 is not particularly limited, but the vapor separator 12 is manufactured as follows for instance. First, the porous body 14 including the fine pores 13 having a desired pore size is fabricated. For example, in the case of using the ceramic material such as alumina or zinc oxide, row material powder is molded and then sintered to form into the porous body 14. The porous body 14 may be fabricated using the above-described organic fiber or using inorganic fiber such as rock wool, ceramic wool, or glass wool. Then, the soluble absorbent 15 is dissolved in water into a solution, and then the porous body is impregnated with the solution and dried to provide the vapor separator 12. The reason why the porous body is dried is for convenience in handling, and therefore it does not need to be dried. The vapor separator 12 may originally contain moisture. The raw material powder for the porous body 14 may be mixed with the soluble absorbent 15 and then molded and sintered.

The vapor separator 12 used for the dehumidifier 1 preferably contains moisture at least in operating the dehumidifier 1. The amount of moisture contained in the vapor separator 12 is preferably set to make the ratio of a volume V2 of water to a volume of the porous body 14 (a solid volume of the porous body 14 excluding the volume of the fine pores 13) V1 (V2/V1) fall within a range of 0.01 to 4. The volume ratio V2/V1 of less than 0.01 may decrease the wet sealing property by the vapor separator 12. A volume ratio (V2/V1) of more than 4 makes it more difficult to allow moisture to exist in the porous body 14. The volume ratio (V2/V1) of the porous body 14 and the moisture contained therein is more preferably in a range of 0.5 to 4, and furthermore preferably in a range of 0.5 to 1. Note that the volume V2 of water means the volume in a state of containing the soluble absorbent 15.

The dehumidifier 1 using the vapor separator 12 in the embodiment can achieve both the vapor separation ratio α and the vapor permeation rate V in addition to the increased safety of the wet seal by the vapor separator 12. This can increase the dehumidification performance by continuous dehumidification accompanied by no regeneration processing. The vapor separator 12 is constituted by allowing the soluble absorbent 15 to exist in the porous body 14, and therefore the mechanical strength of the vapor separator 12 can be increased and the cost of the vapor separator 12 can be reduced. This makes it possible to provide a practical and efficient dehumidifier 1. The characteristics of the vapor separator 12 can be set according not only to the required dehumidification performance but also to the environment in which the vapor separator 12 is installed. For example, when it is desired to make the vapor separator 12 cope with a severe environment in which the vapor separator 12 is installed even if the dehumidification performance slightly decreases, it is preferable to further increase the mechanical strength of the vapor separator 12. Also regarding the dehumidification performance, the characteristics of the vapor separator 12 can be set depending on which of the vapor separation ratio α and the vapor permeation rate V is thought more important.

The vapor separation ratio α and the vapor permeation rate V are defined as follows. The vapor separation ratio α is a ratio between permeation amounts of water and dry air and is defined by the following expression (1).

$$\alpha = (N4_{water}/N4_{air})/(N3_{water}/N3_{air}) \quad (1)$$

In the expression (1), ($N3_{water}/N3_{air}$) represents the molar ratio between water and dry air contained in the air to be supplied to the dehumidified chamber 9 (the first space S1), and ($N4_{water}/N4_{air}$) represents the molar ratio between water and dry air contained in the air to be discharged from the pressure-reduced chamber 10 (the second space S2). The α being 1 means that water and dry air flow at the same ratio from the dehumidification side space S1 to the pressure-reduction side space S2. The α being 100 means that permeation of dry air is decreased to 1/100 relative to permeation of water from the dehumidification side space S1 to the pressure-reduction side space S2.

The vapor permeation rate V is defined by the following expression (2).

$$V = \Delta M_{H2O}/A/\Delta t \quad (2)$$

In the expression (2), $\Delta M_{H2O}$ represents the amount of water to be recovered in the pressure-reduction side space S2, A represents the area of the vapor separator 12, and Δt represents time. Note that the air used for measurement of the vapor permeation rate V has been humidified by bubbling.

Next, examples and their evaluation results will be described.

EXAMPLE 1

An acetone solution of polyvinyl butyral (PVB) with a concentration of 5% was added to high-purity $Al_2O_3$ particles (purity of 99.99% or more) with an average particle diameter of 0.18 μm, and they were mixed together in a mortar. The mixture was filled in a metal mold and molded under a pressure of 1 t/cm², further sintered at 1000° C., and thereby formed into a sintered porous body with a thickness of 1 mm. Measurement of the fine pore shape of the sintered porous body by the mercury intrusion method showed that the fine pore size was 10 to 200 nm, the percentage of fine pores with a pore size of 10 to 100 nm was 90 mass %, and the percentage of fine pores with a pore size of 10 nm to 1 µm was 100 mass %. The volume porosity of the sintered porous body was 42%.

By impregnating the above-described sintered porous body with a saturated solution of $CaCl_2$ and drying the resultant sintered porous body, an intended vapor separator was obtained. The Ca/Al ratio of the vapor separator was 0.11. Measurement of the vapor separation ratio $\alpha$ and the vapor permeation rate V of the vapor separator showed the vapor separation ratio $\alpha>100$ and the vapor permeation rate $V=2000$ g/h/m² under the conditions of a temperature of air supplied to the dehumidification (absorption) side of 40° C. and saturated vapor. Even a test carried out for several hours showed no decreases in the vapor separation ratio $\alpha$ and the vapor permeation rate V. Even the same measurement carried out one month later showed no changes. The ratio of the volume of water to the volume of the porous body after the measurement was 0.72.

EXAMPLE 2

An acetone solution of PVB with a concentration of 5% was added to high-purity ZnO particles (purity of 99.99% or more) with an average particle diameter of 0.15 µm, and they were mixed together in a mortar. The mixture was filled in a metal mold and molded under a pressure of 1 t/cm², further sintered at 1000° C., and thereby formed into a sintered porous body with a thickness of 1 mm. Measurement of the fine pore shape of the sintered porous body by the mercury intrusion method showed that the fine pore size was 10 to 150 nm, the percentage of fine pores with a pore size of 10 to 100 nm was 70 mass %, and the percentage of fine pores with a pore size of 10 nm to 1 µm was 100 mass %. The volume porosity of the sintered porous body was 35%.

By impregnating the above-described sintered porous body with a saturated solution of $CaCl_2$ and drying the resultant sintered porous body, an intended vapor separator was obtained. The Ca/Zn ratio of the vapor separator was 0.12. Measurement of the vapor separation ratio $\alpha$ and the vapor permeation rate V of the vapor separator showed the vapor separation ratio $\alpha>100$ and the vapor permeation rate $V=1500$ g/h/m² under the conditions of a temperature of air supplied to the dehumidification (absorption) side of 40° C. and saturated vapor. Even a test carried out for several hours showed no decreases in the vapor separation ratio $\alpha$ and the vapor permeation rate V. Even the same measurement carried out one month later showed no changes. The ratio of the volume of water to the volume of the porous body after the measurement was 0.54.

EXAMPLE 3

The dehumidifier illustrated in FIG. 4 was constituted using the vapor separator fabricated in Example 1. The amount of moisture in the air to be supplied to the first space was decreased by reducing the pressure in the second space. This dehumidified the space in the room. The dehumidification target space had an initial temperature of 40° C. and a relative humidity of 80%. One-hour operation of the dehumidifier decreased the relative humidity down to 60%. The dehumidifier was operated with the pressure in the second space set to −80 kPa relative to that in the first space. In this event, the temperature of the target space was stable in a range of 40° C.±1° C. Operation with the pressure in the second space set to −100 kPa relative to that in the first space caused deformation of the vapor separator, resulting in gas leakage.

EXAMPLE 4

In the dehumidifier constituted in Example 3, the same dehumidification test was carried out with the vapor separator set supported by punching metal. The dehumidifier was operated with the pressure in the second space set to −90 kPa relative to that in the first space. One-hour operation of the dehumidifier in this state decreased the relative humidity from 80% down to 50%. In this event, the temperature of the target space was stable in a range of 40° C.±1° C.

EXAMPLE 5

The vapor separation ratio $\alpha$ and the vapor permeation rate V of the vapor separator fabricated by the same method as that in Example 1 were measured immediately after drying. The vapor separation ratio $\alpha=1$ and the vapor permeation rate $V=400$ g/h/m² under the conditions of a temperature of air supplied to the dehumidification (absorption) side of 40° C. and saturated vapor were measured immediately after start of the measurement. V decreased with a gradual increase in $\alpha$, resulting in that $\alpha>100$ and the vapor permeation rate $V=2000$ g/h/m² in several minutes. When the dry air is made to flow through this material, the material does not form any wet seal and the gas (dry air) permeates as it is. Therefore, it is considered that the wet seal has not been completed yet immediately after start of the measurement and most of gas permeates as it is, and therefore $\alpha$ is small and V is large.

COMPARATIVE EXAMPLE 1

Zeolite being a dense film with a thickness of 5 µm and with no or less volume porosity and assumed to have a fine pore size of 0.4 to 10 nm was formed on a porous base material with a thickness of 1 mm. The resultant film was used as the vapor separator, and the vapor separation ratio $\alpha$ and the vapor permeation rate V were measured. The vapor separation ratio $\alpha$ was 100 or more but the vapor permeation rate V was 500 g/h/m² under the conditions of a temperature of air supplied to the dehumidification (absorption) side of 40° C. and saturated vapor. Since the zeolite in Comparative example 1 is a thin film, the mechanical strength thereof is low and the manufacturing cost is high. Therefore, the zeolite in Comparative example 1 failed to constitute a practical dehumidifier. The zeolite in a thin film form was difficult to evaluate by the mercury intrusion method, and therefore its porosity was estimated from a SEM image and its fine pore size was estimated from literature values and the SEM image.

EXAMPLE 6

An acetone solution of PVB with a concentration of 5% was added to high-purity $Al_2O_3$ particles (purity of 99.99% or more) with an average particle diameter of 1 µm, and they were mixed together in a mortar. The mixture was filled in a metal mold and molded under a pressure of 1 t/cm² and sintered at 1300° C., and thereby formed into a sintered porous body with a thickness of 1.5 mm. Measurement of the fine pore shape of the sintered porous body by the mercury intrusion method showed that the fine pore size was 20 nm to 1 µm, the percentage of fine pores with a pore size of 10 to 100 nm was 60 mass %, the percentage of fine pores with a pore size of 100 nm to 1 μm was 40 mass %, and the percentage of fine pores with a pore size of 10 nm to 1 μm was 100 mass %. The volume porosity of the sintered porous body was 38%.

By impregnating the above-described sintered porous body with a saturated solution of $CaCl_2$ and drying the resultant sintered porous body, an intended vapor separator was obtained. The Ca/Al ratio of the vapor separator was 0.2. Measurement of the vapor separation ratio α and the vapor permeation rate V of the vapor separator showed the vapor separation ratio α>100 and the vapor permeation rate V=2000 g/h/m² under the conditions of a temperature of air supplied to the dehumidification (absorption) side of 40° C. and saturated vapor. Even a test carried out for several hours showed no decreases in the vapor separation ratio α and the vapor permeation rate V. Even the same measurement carried out one month later showed no changes. The ratio of the volume of water to the volume of the porous body after the measurement was 0.61.

EXAMPLE 7

An acetone solution of PVB with a concentration of 5% was added to high-purity $Al_2O_3$ particles (purity of 99.99% or more) with an average particle diameter of 2 μm, and they were mixed together in a mortar. The mixture was filled in a metal mold and molded under a pressure of 1 t/cm² and sintered at 1350° C., and thereby formed into a sintered porous body with a thickness of 2 mm. Measurement of the fine pore shape of the sintered porous body by the mercury intrusion method showed that the fine pore size was 100 nm to 1.5 μm, the percentage of fine pores with a pore size of 100 nm to 1 μm was 70 mass %, and the percentage of fine pores with a pore size of 10 nm to 1 μm was 70 mass %. The volume porosity of the sintered porous body was 33%.

By impregnating the above-described sintered porous body with a saturated solution of $CaCl_2$ and drying the resultant sintered porous body, an intended vapor separator was obtained. The Ca/Al ratio of the vapor separator was 0.2. Measurement of the vapor separation ratio α and the vapor permeation rate V of the vapor separator showed a vapor separation ratio α=50 and a vapor permeation rate V=3500 g/h/m² under the conditions of a temperature of air supplied to the dehumidification (absorption) side of 40° C. and saturated vapor. Even a test carried out for several hours showed no decreases in the vapor separation ratio α and the vapor permeation rate V. Even the same measurement carried out one month later showed no changes. The ratio of the volume of water to the volume of the porous body after the measurement was 0.58.

EXAMPLE 8

An acetone solution of PVB with a concentration of 5% was added to high-purity $Al_2O_3$ particles (purity of 99.99% or more) with an average particle diameter of 0.5 μm, and they were mixed together in a mortar. The mixture was filled in a metal mold and molded under a pressure of 1 t/cm² and sintered at 1200° C., and thereby formed into a sintered porous body with a thickness of 2 mm. Measurement of the fine pore shape of the sintered porous body by the mercury intrusion method showed that the fine pore size was 30 nm to 1.3 μm, the percentage of fine pores with a pore size of 100 nm to 1 μm was 70 mass %, and the percentage of fine pores with a pore size of 10 nm to 1 μm was 80 mass %. The volume porosity of the sintered porous body was 40%.

By impregnating the above-described sintered porous body with a saturated solution of $CaCl_2$ and drying the resultant sintered porous body, an intended vapor separator was obtained. The Ca/Al ratio of the vapor separator was 0.2. Measurement of the vapor separation ratio α and the vapor permeation rate V of the vapor separator showed a vapor separation ratio α=20 and a vapor permeation rate V=4000 g/h/m² under the conditions of a temperature of air supplied to the dehumidification (absorption) side of 40° C. and saturated vapor. Even a test carried out for several hours showed no decreases in the vapor separation ratio α and the vapor permeation rate V. Even the same measurement carried out one month later showed no changes. The ratio of the volume of water to the volume of the porous body after the measurement was 0.67.

EXAMPLE 9

An acetone solution of PVB with a concentration of 5% was added to a mixture of high-purity $Al_2O_3$ particles (purity of 99.99% or more) with an average particle diameter of 0.18 μm and high-purity $Al_2O_3$ particles (purity of 99.99% or more) with an average particle diameter of 1.5 μm, and they were mixed together in a mortar. The mixture was filled in a metal mold and molded under a pressure of 1 t/cm² and sintered at 1200° C., and thereby formed into a sintered porous body with a thickness of 1 mm. Measurement of the fine pore shape of the sintered porous body by the mercury intrusion method showed that the fine pore size was 10 nm to 1.2 μm, the percentage of fine pores with a pore size of 10 to 100 nm was 40 mass %, the percentage of fine pores with a pore size of 100 nm to 1 μm was 50 mass %, and the percentage of fine pores with a pore size of 10 nm to 1 μm was 90 mass %. The volume porosity of the sintered porous body was 25%.

By impregnating the above-described sintered porous body with a saturated solution of $CaCl_2$ and drying the resultant sintered porous body, an intended vapor separator was obtained. The Ca/Al ratio of the vapor separator was 0.2. Measurement of the vapor separation ratio α and the vapor permeation rate V of the vapor separator showed a vapor separation ratio α=10 and a vapor permeation rate V=3000 g/h/m² under the conditions of a temperature of air supplied to the dehumidification (absorption) side of 40° C. and saturated vapor. Even a test carried out for several hours showed no decreases in the vapor separation ratio α and the vapor permeation rate V. Even the same measurement carried out one month later showed no changes. The ratio of the volume of water to the volume of the porous body after the measurement was 0.33.

EXAMPLE 10

The dehumidifier illustrated in FIG. 4 was constituted using the vapor separator fabricated in Example 8. The amount of moisture in the air existing in the first space was decreased by reducing the pressure in the second space. This dehumidified the space in the room. The dehumidification target space had an initial temperature of 30° C. and a relative humidity of 80%. Thirty-minute operation of the dehumidifier decreased the relative humidity down to 55%. The dehumidifier was operated with the pressure in the second space set to −80 kPa relative to that in the first space. In this event, the temperature of the target space was stable in a range of 40° C.±1° C.

EXAMPLE 11

The dehumidifier illustrated in FIG. 4 was constituted using the vapor separator fabricated in Example 8. The amount of moisture in the air existing in the first space was decreased by reducing the pressure in the second space. This dehumidified the space in the room. The dehumidification target space had an initial temperature of 30° C. and a relative humidity of 70%. Ten-minute operation of the dehumidifier decreased the relative humidity down to 60%. The dehumidifier was operated with the pressure in the second space set to −80 kPa relative to that in the first space. In this event, the temperature of the target space was stable in a range of 40° C.±1° C.

REFERENCE EXAMPLE 1

A commercially available alumina porous body was prepared. Measurement of the fine pore shape of the alumina porous body by the mercury intrusion method showed that the fine pore size was 20 to 3000 nm, and the percentage of fine pores with a pore size of 10 nm to 1 μm was 40 mass %. The volume porosity of the alumina porous body was 43%. By impregnating the alumina porous body with a saturated solution of $CaCl_2$ and drying the resultant alumina porous body, a vapor separator was fabricated. Measurement of the vapor separation ratio α and the vapor permeation rate V of the vapor separator showed a vapor separation ratio α=1 and a vapor permeation rate V=4500 g/h/m² under the conditions of a temperature of air supplied to the dehumidification (absorption) side of 40° C. and saturated vapor. The vapor separator was subjected to the dehumidification test as in Example 10 and failed in sufficient dehumidification.

EXAMPLE 12

An acetone solution of PVB with a concentration of 5% was added to high-purity $Al_2O_3$ particles (purity of 99.99% or more) with an average particle diameter of 0.18 μm, and they were mixed together in a mortar. The mixture was filled in a metal mold and molded under a pressure of 1 t/cm² and sintered at 1350° C., and thereby formed into a sintered porous body with a thickness of 3 mm. Measurement of the fine pore shape of the sintered porous body by the mercury intrusion method showed that the fine pore size was 10 to 100 nm, and the percentage of fine pores with a pore size of 10 nm to 1 μm was 100 mass %. The volume porosity of the sintered porous body was 11%.

By impregnating the above-described sintered porous body with a saturated solution of $CaCl_2$ and drying the resultant sintered porous body, an intended vapor separator was obtained. The Ca/Al ratio of the vapor separator was 0.02. Measurement of the vapor separation ratio α and the vapor permeation rate V of the vapor separator showed a vapor separation ratio α>100 and a vapor permeation rate V=150 g/h/m² under the conditions of a temperature of air supplied to the dehumidification (absorption) side of 40° C. and saturated vapor. The ratio of the volume of water to the volume of the porous body after the measurement was 0.12.

EXAMPLE 13

An acetone solution of PVB with a concentration of 5% was added to high-purity $Al_2O_3$ particles (purity of 99.99% or more) with an average particle diameter of 0.18 μm, and they were mixed together in a mortar. The mixture was filled in a metal mold and molded under a pressure of 1 t/cm² and sintered at 1250° C., and thereby formed into a sintered porous body with a thickness of 3 mm. Measurement of the fine pore shape of the sintered porous body by the mercury intrusion method showed that the fine pore size was 10 nm to 100 nm, and the percentage of fine pores with a pore size of 10 nm to 1 μm was 100 mass %. The volume porosity of the sintered porous body was 15%.

By impregnating the above-described sintered porous body with a saturated solution of $CaCl_2$ and drying the resultant sintered porous body, an intended vapor separator was obtained. The Ca/Al ratio of the vapor separator was 0.02. Measurement of the vapor separation ratio α and the vapor permeation rate V of the vapor separator showed a vapor separation ratio α>100 and a vapor permeation rate V=300 g/h/m² under the conditions of a temperature of air supplied to the dehumidification (absorption) side of 40° C. and saturated vapor. The ratio of the volume of water to the volume of the porous body after the measurement was 0.18.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A vapor separator arranged between a first space and a second space, the vapor separator comprising: a porous body having a first face, a second face opposite to the first face, and fine pores passing from the first face to the second face; and a soluble absorbent existing in the fine pores of the porous body, wherein the vapor separator is configured to be permeated by vapor existing in the first space in the second space by making a vapor pressure in the second space lower than a vapor pressure in the first space, wherein the soluble absorbent contains at least one selected from the group consisting of citrate, carbonate, phosphate, halide salt, oxysalt, hydroxide salt, and sulfate of a first element composed of a group 1 element or a group 2 element, and wherein the porous body comprises a ceramic material containing at least one selected from a group consisting of oxide, nitride, and carbide of a second element composed of aluminum, silicon, zinc, magnesium, calcium, barium, nickel, cobalt, iron, chromium, titanium, zirconium, or copper, or a metal material containing a third element composed of aluminum, zinc, magnesium, nickel, cobalt, iron, titanium, zirconium, or copper.

2. The vapor separator of claim 1, further comprising: water held in the soluble absorbent.

3. The vapor separator of claim 1, wherein a volume porosity of the porous body is 10% or more and 80% or less.

4. The vapor separator of claim 1, wherein the fine pores of the porous body contain 50 mass % or more of pores having a pore size of 10 nm or more and 1 μm or less.

5. The vapor separator of claim 1, wherein a maximum pore size of the fine pores of the porous body is 3 μm or less.

6. The vapor separator of claim 1, wherein an atom ratio of the first element to the second element or the third element is 0.004 or more and 0.4 or less.

7. The vapor separator of claim 2, wherein a ratio of a volume of the water to a volume of the porous body is 0.01 or more and 4 or less.

8. A dehumidifier, comprising:
a first space;
a second space communicating with the first space;

the vapor separator according to claim 1 arranged between the first space and the second space, the vapor separator being provided to separate the first space and the second space while exposing the first face in the first space and exposing the second face in the second space; and a vapor pressure adjusting unit which adjusts a vapor pressure in the second space to make the vapor pressure in the second space lower than a vapor pressure in the first space, wherein the vapor existing in the first space is permeated in the second space through the vapor separator.

9. The dehumidifier of claim 8, wherein the vapor pressure adjusting unit comprises a pressure adjusting unit which reduces a pressure in the second space to be lower than a pressure in the first space.

10. The dehumidifier of claim 9, wherein the pressure adjusting unit is controlled to make the pressure in the second space −50 kPa or less relative to the pressure in the first space.

11. The dehumidifier of claim 8, wherein the vapor separator is supported by a substrate which allows gas to permeate.

12. The dehumidifier of claim 8, wherein the vapor separator further comprises water held in the soluble absorbent.

\* \* \* \* \*